(12) United States Patent
Smith

(10) Patent No.: US 6,276,469 B1
(45) Date of Patent: Aug. 21, 2001

(54) LIGHT WEIGHT TRANSPORTER PROPELLING FLUID LEVITATED LOADS INCLUDES LOAD WEIGHT ABSORPTION DEVICE TO PROVIDE CONTROLLABLE WHEEL TRACTION

(76) Inventor: Jason L. Smith, 2053 Grant Ave. #109, Los Altos, CA (US) 94024

( * ) Notice: Subject to any disclaimer, the term of this patent is extended or adjusted under 35 U.S.C. 154(b) by 0 days.

(21) Appl. No.: 09/528,498

(22) Filed: Mar. 20, 2000

(51) Int. Cl.[7] .......................... B62D 51/04; B62D 53/00; B60V 1/00
(52) U.S. Cl. ................... 180/19.1; 180/14.1; 180/125; 280/490.1; 280/405.1; 280/407
(58) Field of Search .................. 180/19.1–19.3, 180/14.1, 125; 280/490.1, 405.1, 407

(56) References Cited

U.S. PATENT DOCUMENTS

| | | | |
|---|---|---|---|
| 3,269,475 | * 8/1966 | Voelker | 180/19.1 |
| 3,485,314 | * 12/1969 | Herr | 180/19.1 |
| 3,770,070 | 11/1973 | Smith | 180/13 |
| 3,825,094 | 7/1974 | Burdick | 180/125 |
| 3,831,708 | 8/1974 | Terry | 180/119 |
| 3,891,048 | 6/1975 | Burdick | 180/119 |
| 3,995,876 | 12/1976 | Ronne | 280/423 A |
| 5,139,102 | 8/1992 | Pocapalia | 180/19.2 |

OTHER PUBLICATIONS

Air Caster Corp., Brochure 106L, no date.

* cited by examiner

*Primary Examiner*—Brian L. Johnson
*Assistant Examiner*—Matthew Luby
(74) *Attorney, Agent, or Firm*—Donald W. Banner

(57) ABSTRACT

An improved transporter to guide and propel heavy loads in an industry where the loads levitate upon pressurized fluid plenums. The transporter is very light weight that provides many opportunities of lower cost, small size, ease of movement to its point of use, short turn radius, etc. The transporter is able to pull or push very heavy loads with such light weight. The key is that transporter includes a vertical forcing device, such as a piston and cylinder. The forcing device pushes upward against a load hitch rigidly attached to the load. More importantly, the forcing device pushes downward on transporter drive wheels. The vertical downward force on the wheels is controllable. Force can vary from so minimal as to allow wheel slipping on the floor during steering, to extreme force facilitating maximum desired pulling or pushing wheel traction.

3 Claims, 2 Drawing Sheets

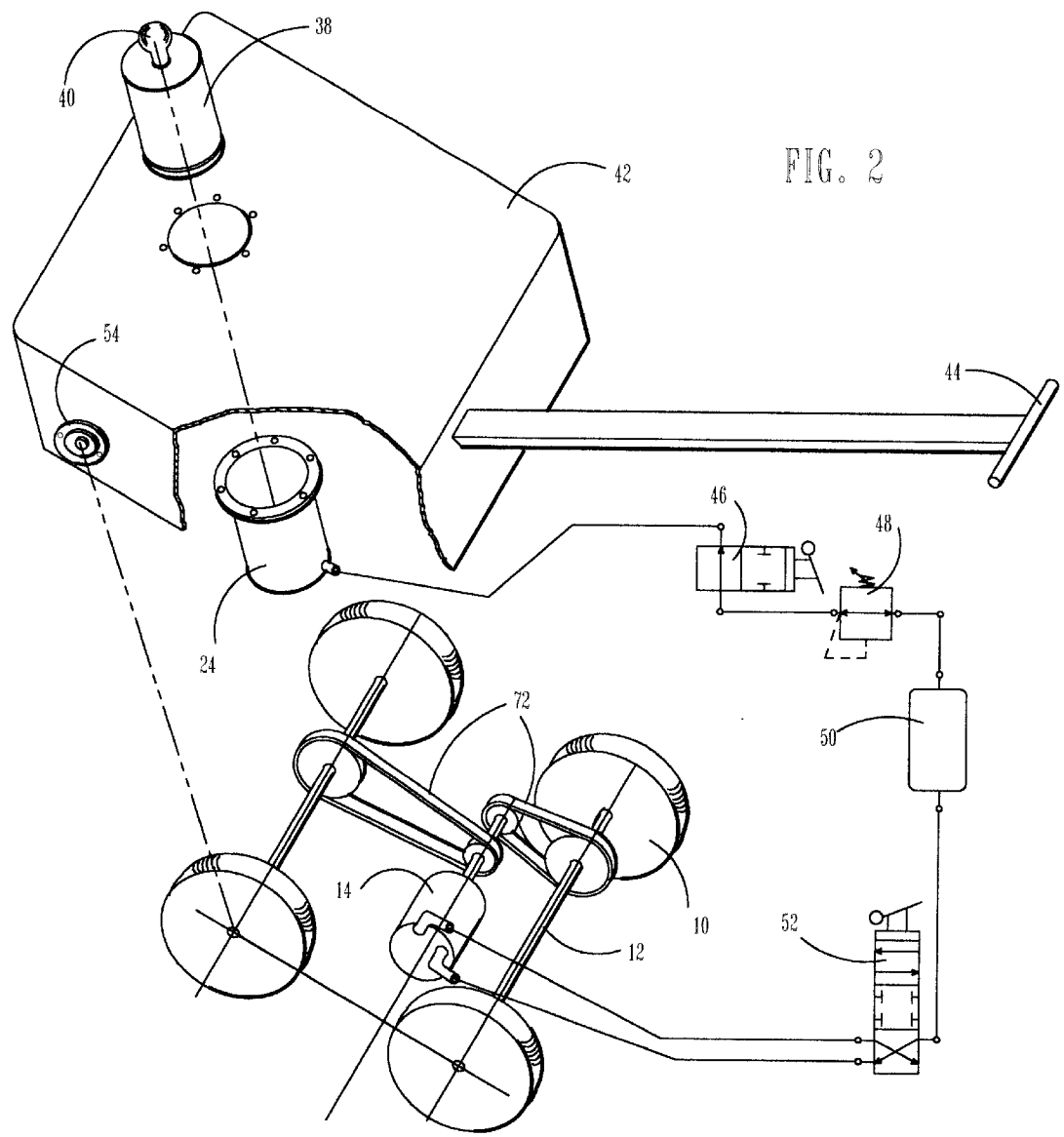

LIGHT WEIGHT TRANSPORTER PROPELLING FLUID LEVITATED LOADS INCLUDES LOAD WEIGHT ABSORPTION DEVICE TO PROVIDE CONTROLLABLE WHEEL TRACTION

BACKGROUND

1. Field of the Invention

This invention applies to transporters concerned with guidance and propulsion of heavy loads from place to place about the floor. In this industry, load levitates upon a pressurized plenum cushion of air during movement. An unrelated industry uses a tractor that includes a similar piston weight lifting structure to that of this invention, but is used for a different purpose. The purpose of the tractor lifting device in that industry is to lift the front end of a mobile home trailer, fifth wheel tailer, or boat trailer up off their rest frame for wheeling about by tractor. This industry is different from the industry of my invention for the primary reason that the loads to be moved are not fluid plenum levitated, but instead are supported by a trailer with wheels. An example of an invention in this other industry includes that disclosed in U.S. Pat No. 3,995,876 by Ronne, Dec. 7, 1976.

BACKGROUND

2. Description of the Prior art

Prior art transporters in the industry of this invention, utilize only one motor powered drive wheel to propel load. Attachment arms connecting load to transporter are long and complex. One such example appears in Air Caster Corp brochure 106. Another invention example was disclosed in U.S. Pat. No. 3,831,708 by Terry, Aug. 27, 1974. The single drive wheel structure is quite durable to sustain considerable downward forces and high friction force against the floor. The single drive wheel is thick, includes rugged bearings, and is made from expensive soft rubber like material on a metal hub much like that of the wheel of a motor scooter. All prior art transporters are heavy in the range of several hundred pounds supporting adequate drive wheel pulling traction. The use of a single drive wheel in all prior art transporters is the inventor's method to facilitate steering by avoiding multiple drive wheel sliding problems while turning. To date, no transporters have attempted to use multiple powered drive wheels that include differentials or disconnecting clutching means probably because the cost and size would be prohibitive. These prior art transporters include several structural deficiencies because:

i. the attachment arm design is complex and expensive
  ii. the attachment arm length between the transporter and load is too long for sharp steering
  iii. they use an expensive single drive wheel
  iv. the transporter is very heavy.

These transporters cost much more than they need to for the job they perform. Transporter weight makes them difficult and inconvenient to move from one factory area to another point of use. Transporter turning radius around doorways and the like is limited over what it could be for a smaller sized transporter that uses a short arm to connect the load.

The object of my invention is to eliminate the objections noted above in connection with known systems of this character. My invention provides a short connecting arm, the ability to steer using multiple drive wheels, is light weight, and includes excellent traction control.

SUMMARY OF THE INVENTION

My invention contributes a propelling and guiding transporter to the industry of air bearing levitated heavy loads with unique and improved features. Prior art transporters were heavy, with long attachment distances between transporter and load, and propel using only one drive wheel. These features rendered the transporters expensive, large in size, unable to make sharp turns around doorways, and their heavy weight made them difficult to relocate to their point of use. My invention includes a unique structure for this industry that eliminates the above objections.

My transporter has lightweight as a key objective. It is hundreds of pounds lighter than transporters of prior art. A human operator can lift and move my transporter to its point of use without powering up. However, the primary objective is that my transporter can have a multitude of drive wheels all connected to a motor simultaneously. The light weight was key to meet this objective in that the connected drive wheels can slide on the floor as the operator steers the transporter. The wheels can slide because drive wheel traction with the floor can be minimal. Without high downward transporter weight, wheel traction is slight. However, high downward force is necessary while transporter is pulling or pushing load. My invention solves this enigma, uniquely to this industry, by adding a force generating means such as a piston and cylinder to the transporter. The pressurized piston can force up onto attachment arm hitch between transporter and load. Its reaction force is downward providing the necessary wheel traction at times when transporter is pulling or pushing the load. Transporter is smaller than prior art transporters performing similar tasks and has a shorter attachment arm to load. Therefore tighter turns are possible with my invention. The transporter of my invention costs less than those of prior art. My invention requires no complex single wheel drive mechanism including costly bearings and robust motor scooter type drive wheel.

DRAWING FIGURES

By way of example, an embodiment of my invention is illustrated herein by the accompanying drawings, wherein:

FIG. 2 is a perspective exploded view of transporter alone showing more detail including internal components and symbolically represented fluid power controls.

DESCRIPTION OF THE PREFERRED EMBODIMENT

1. The Invention in General

Figure 1:
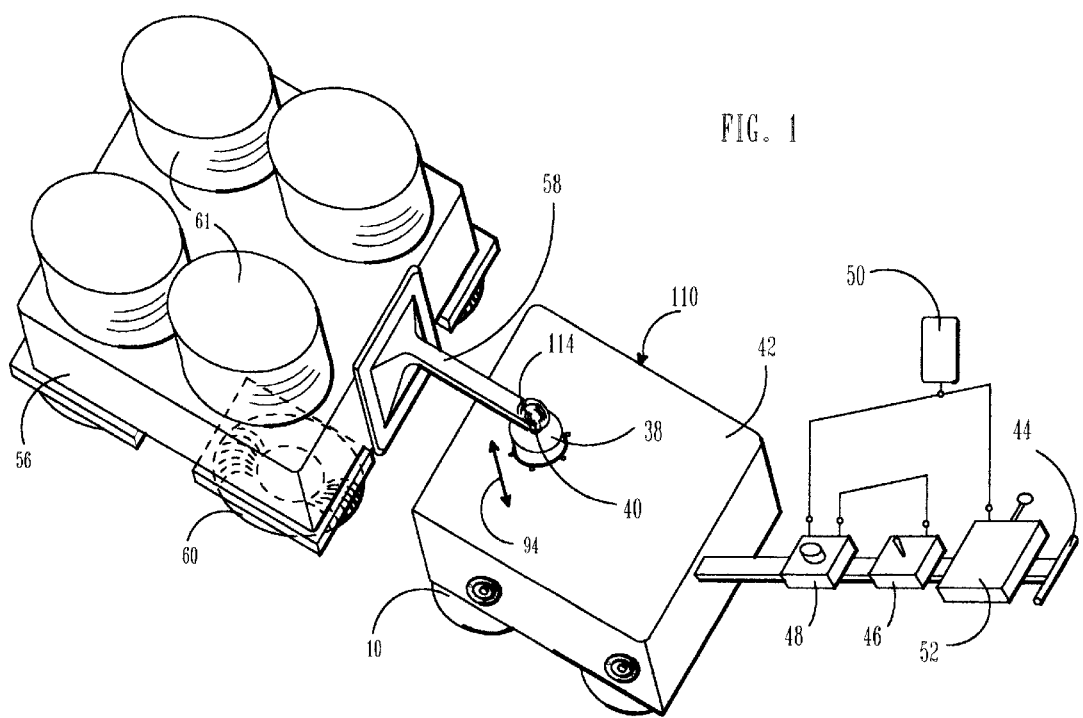
FIG. 1 is perspective view of transporter shown interconnected to load levitated upon air casters including pressurized fluid power controls.

The view of FIG. 1 refers to my invention as transporter 110. Transporter 110 shows interconnection to a heavy load 61 that moves upon a load base 56 structure. Load base 56 levitates off the floor on air plenums created by air caster 60 devices. The plenum cavities of air casters pressurize with compressed air or other fluid, as is well known in the art. While levitated, heavy load base 56 approaches frictionlessness with the floor. Load base 56 moves about the floor via transporter 110 pulling or pushing force.

Although not part of the invention, the view of FIG. 1 shows a short and light weight attachment arm 58 rigidly attached to load base 56. At the opposite end of arm 58 is joined a socket 114 much like that used with popular automobile trailer hitches. Socket 114 orbitably attaches to a hitch ball 40 that attaches to a piston 38 both of which are part of transporter 110 structure. Ball 40 can include a threaded shaft connection to a similarly female threaded piston 38 providing additional height adjustment for hitching matchup. The combination of arm 58, socket 114 and ball 40 allows transporter 110 to rotate about both vertical and horizontal axes with respect to load base 56 while moving.

The arm distance between a load base and a transporter is a critical problem for an operator trying to steer the load base around a corner such as occurs at factory doorways. The longer the arm is, the less able the transporter is to negotiate tight turns. Prior art transporter inventions use an attachment arm that is quite complex and long. My transporter invention uses a short arm 58, and has an advantage of negotiating tighter turns than those of prior art. Piston 38 pressurizes or depressurizes by operator actuation of a valve 46 and a regulator 48 combination plumbed to a facility pressurized air source 50. When piston 38 is depressurized, it and attached ball 40 exerts no upward force 94 upon socket 114 and arm 58. Also, when piston 38 is depressurized, there is no reaction downward force 94 upon a transporter housing 42. Without strong downward force 94, drive wheels 10 have very light friction force with the floor. With minimal friction force, transporter 110 easily rotates about ball 40 axis by operator steering transporter 110 via pulling left or right on a handle 44 pivotably attached to housing 42. As transporter 110 turns, drive wheels 10 slide on the floor because of low friction forces. Such transporter 110 rotation would be desirable while transporter 110 is being steered or pointed in a new direction.

2. Invention Construction Detail

The view of FIG. 2 shows piston 38 sliding axially within a cylinder 24 that bolts to transporter housing 42. Piston 38 is made of delrin, and includes an o-ring seal. Cylinder 24 is made of steel. Both could be made of another strong material such as aluminum, composite fiber, nylon, etc.

The pressurized fluid controls includes a facility pressure air supply 50 plumbs to regulator 48. The output port of regulator 48 plumbs to one way pressure relieving valve 46. The output port of valve 46 plumbs to the bottom of cylinder 24. When cylinder 24 pressures, ball 40 exerts upward force against socket 114 and arm 58, shown in FIG. 1 view, in the range of hundreds of pounds.

FIG. 2 view also shows details of transporter 110 power drive structure. Four drive wheels 10 rigidly attach to shafts 12 that connect to housing 42 via bearings 54. Connecting shafts 12 to drive motor 14 are power transmission means 72, such as a chain and sprocket type. Pressurize fluid motor 14 plumbs to a four way valve 52. Valve 52 plumbs to facility pressurized air supply 50. Drive components are like others known in the industry, and can be purchased from industrial component supply catalogs like McMaster Carr of Los Angeles. The particular wheels 10 selected are made of molded polyurethane. A steel custom hub, not shown, bolts to each wheel 10. The hub attaches to shaft 12 with key and key ways and set screws, not shown.

The pressurized fluid drive and components show a preferred embodiment and do not mean to limit the invention to same. Other motors such as electric powered can be used as an alternative embodiment of my invention. Referring to views of both FIGS. 1 and 2, pressurized cylinder 24 mode of operation would be desirable during transporter 110 propulsion of load base 56. Downward force 94 magnitude is controllable simply by altering cylinder 24 pressure using regulator 48. Large downward force 94 upon housing 42 is that necessary to cause proper traction for drive wheels 10 against the floor. This utility of using Piston 48 or other force generating element as part of transporter 110 design to apply downward traction force for drive wheels 10 is an object of my invention. Piston 48 force easily allows transporter 110 to use multiple drive low cost wheels 10 to effect high traction. This unique solution to provide transporter traction is more simple and economical than single wheel drives and all alterative methods used with prior art transporters.

My invention would typically include four drive wheels 10. Each drive wheel 10 experiences only a fraction of the traction force against the floor and downward force 94. Multiple drive wheels 10 of my invention are together lower cost than the single complex drive wheel of prior art. Drive wheels 10 of my invention, as noted above, are made from inexpensive light weight material. The bearings 54 are light duty, light weight, and low cost relative to those of prior art. Prior art transporters are very heavy because they include era large parts and more importantly, because the heavy weight provides the downward force for drive wheel traction. They are difficult and awkward to carry around the facility where they are being deployed. Usually the transporter connects to a fluid power source and driven to its point of use. My transporter invention 110 requires many fewer parts and is hundreds of pounds lighter weight. It pushes by hand or can be lifted by hand onto a simple furniture dolly cart for wheeling to its point of use in the facility. This setup advantage of my invention 110 is important to the operator.

In summary, prior art transporter inventions have certain deficiencies because:

i. they have extra complex drive components
ii. they can not turn sharply
iii. they are large in size
iv. they, are costly
v. they are heavy and harder to move to point of use in the factory.

My invention 110 corrects these deficiencies.

3. Alternate Embodiments

The particular embodiment described is that preferred, however an alterative embodiment could use an electric drive motor, not shown, instead of a hydraulic or pneumatic motor 14.

Another embodiment could use an air bag, not shown, as the downward forcing means instead of piston 38 and cylinder 24 combination. The air bag is well known in the industry and is usually purchased from Goodyear or Firestone companies. Any force generating device with a compliant stroke exceeding an inch or so could perform a similar function to piston 38 and cylinder 24 combination.

The embodiments and descriptions above have been by way of illustration, rather than limitation. The scope and content of this invention being determined by the following claims.

I claim:

1. A light weight transporter used to steer and propel a fluid plenum levitated load comprising:

a. a body carriage having rotatable wheels mounted thereto for enabling said carriage to roll along a floor;
 b. a motor mounted in said carriage;
 c. a means for coupling said motor to one or more of said wheels so as to propel said carriage about said floor;
 d. a downward adjustable forcing means mounted in said carriage which permits a variable traction force of said wheels with said floor, a reaction force of said forcing means can push vertically against a hitch rigidly attached to said load; whereby
 e. a human operator can select said downward force to achieve a minimal said traction to facilitate steering of said light weight carriage, while said wheels slip on said floor; or a maximum said traction facilitating said carriage pull or push force against said load.

2. The light weight transporter used to steer and propel a fluid plenum levitated load of claim 1 wherein said downward adjustable forcing means mounted in said carriage has the structure of a piston and cylinder combination.

3. The light weight transporter used to steer and propel a fluid plenum levitated load of claim 1 wherein said downward adjustable forcing means mounted in said carriage has the structure of a fluid expandable bag.

* * * * *